United States Patent
Poisson et al.

(10) Patent No.: US 10,106,266 B2
(45) Date of Patent: Oct. 23, 2018

(54) SUSPENSION STRUCTURE FOR SUSPENDING A TURBOPROP HAVING TWO UNDUCTED PROPELLERS FROM A STRUCTURAL ELEMENT OF AN AIRCRAFT WITH RIGID FASTENING OF THE AIR INTAKE STRUCTURE

(71) Applicant: SAFRAN AIRCRAFT ENGINES, Paris (FR)

(72) Inventors: Mathieu Ange Poisson, Corbeil Essonnes (FR); Francois Robert Bellabal, Bayonne (FR); Nicolas Florent, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 153 days.

(21) Appl. No.: 15/110,670

(22) PCT Filed: Jan. 7, 2015

(86) PCT No.: PCT/FR2015/050024
§ 371 (c)(1),
(2) Date: Jul. 8, 2016

(87) PCT Pub. No.: WO2015/104494
PCT Pub. Date: Jul. 16, 2015

(65) Prior Publication Data
US 2016/0376016 A1    Dec. 29, 2016

(30) Foreign Application Priority Data
Jan. 10, 2014    (FR) ...................................... 14 50170

(51) Int. Cl.
*B64D 27/26*    (2006.01)
*B64D 33/02*    (2006.01)
*F02C 6/20*    (2006.01)
*B64D 27/00*    (2006.01)

(52) U.S. Cl.
CPC ............. *B64D 27/26* (2013.01); *B64D 33/02* (2013.01); *F02C 6/206* (2013.01);
(Continued)

(58) Field of Classification Search
CPC .. B64D 27/26; B64D 33/02; B64D 2027/262; B64D 2027/005; F02C 6/206;
(Continued)

(56) References Cited

U.S. PATENT DOCUMENTS

| 3,952,973 A | 4/1976 | James |
| 8,226,028 B2 * | 7/2012 | Marche .................. B64D 27/12 244/54 |

(Continued)

FOREIGN PATENT DOCUMENTS

| CA | 2 839 336 A1 | 12/2012 |
| EP | 1 538 080 A1 | 6/2005 |

(Continued)

OTHER PUBLICATIONS

International Search Report dated Apr. 2, 2015 for PCT/FR2015/050024 filed on Jan. 7, 2015.

*Primary Examiner* — Valentina Xavier
(74) *Attorney, Agent, or Firm* — Oblon, McClelland, Maier & Neustadt, L.L.P.

(57) ABSTRACT

A suspension structure for suspending a turboprop including two unducted propellers from a structural element of an aircraft, the structure including a suspension frame for fastening to a structural element of the aircraft and including a main beam extending parallel to a longitudinal axis of the turboprop, the suspension frame being fastened to an air intake structure of the turboprop by an attachment frame.

10 Claims, 3 Drawing Sheets

(52) U.S. Cl.
CPC .. *B64D 2027/005* (2013.01); *B64D 2027/262* (2013.01); *F05D 2220/325* (2013.01); *F05D 2240/14* (2013.01); *Y02T 50/44* (2013.01); *Y02T 50/66* (2013.01); *Y02T 50/671* (2013.01)

(58) Field of Classification Search
CPC ....... Y02T 50/44; Y02T 50/66; Y02T 50/671; F05D 2240/14; F05D 2220/325
See application file for complete search history.

(56) References Cited

U.S. PATENT DOCUMENTS

| | | | |
|---|---|---|---|
| 9,238,511 B2 * | 1/2016 | Woolley | B64D 27/26 |
| 2005/0116093 A1 * | 6/2005 | Machado | B64D 27/12 |
| | | | 244/54 |
| 2008/0251634 A1 * | 10/2008 | Bernardi | B64D 27/18 |
| | | | 244/54 |
| 2011/0121132 A1 * | 5/2011 | Crook | B64D 27/18 |
| | | | 244/54 |
| 2012/0056033 A1 * | 3/2012 | Teulou | B64D 27/26 |
| | | | 244/54 |
| 2012/0104162 A1 * | 5/2012 | West | B64C 1/1453 |
| | | | 244/54 |
| 2012/0168558 A1 * | 7/2012 | Journade | B64D 27/18 |
| | | | 244/54 |
| 2012/0175462 A1 | 7/2012 | Journade et al. | |
| 2014/0130512 A1 * | 5/2014 | Chouard | B64D 27/14 |
| | | | 60/797 |

FOREIGN PATENT DOCUMENTS

| | | |
|---|---|---|
| FR | 2 950 323 A1 | 3/2011 |
| FR | 2 951 504 A1 | 4/2011 |

* cited by examiner

SUSPENSION STRUCTURE FOR SUSPENDING A TURBOPROP HAVING TWO UNDUCTED PROPELLERS FROM A STRUCTURAL ELEMENT OF AN AIRCRAFT WITH RIGID FASTENING OF THE AIR INTAKE STRUCTURE

BACKGROUND OF THE INVENTION

The present invention relates to the general field of aircraft turboprops having two unducted propellers. More precisely, the invention relates to attaching such a turboprop to a structural element of the aircraft, such as the fuselage or a wing of an airplane.

In known manner, an aircraft turboprop having two propellers is a gas turbine aeroengine that generates its main thrust by means of two unducted contrarotating propellers that are positioned at the rear of the engine.

By way of example, such a turboprop may be attached to the fuselage of an aircraft via a pylon connected to a suspension structure, which structure is fastened directly to the engine.

Simulations of the dynamic behavior of the assembly made up of the turboprop and its suspension structure have revealed the presence of a vibration mode of the air intake structure of the turboprop that lies within the operating range of the engine. However, the presence of such a mode in the operating range of the engine has the effect of multiplying dynamic loads on certain bearings of the turboprop.

Unless made stiffer, thereby significantly increasing the second moment of area of a portion of the casing line, such engines are not all capable of withstanding such forces. Also, it is necessary to keep the vibration mode remote from the operating range of the engine. To do this, one solution consists in reducing the weight of the assembly. Nevertheless, it is usually not possible to achieve such weight reduction. Another solution consists in modifying the way the air intake is attached to the engine, e.g. by adding an additional partition. Nevertheless, none of the structures for attaching the inlet to the engine and that have been tested so far has been found to be effective in mitigating such a drawback.

OBJECT AND SUMMARY OF THE INVENTION

A main object of the present invention is thus to propose a suspension structure enabling the drawbacks associated with the dynamic presence of abnormal vibration modes to be avoided.

In accordance with the invention, this object is achieved by a suspension structure for suspending a turboprop having two unducted propellers from a structural element of an aircraft, the structure comprising a suspension frame for fastening to a structural element of the aircraft and having a main beam extending parallel to a longitudinal axis of the turboprop, the suspension frame being fastened to an air intake structure of the turboprop by means of an attachment frame.

The suspension structure of the invention is remarkable in that it enables the air intake structure of the turboprop to be rigidly attached to the suspension frame. Thus, the forces generated by the support of the air intake structure are taken up essentially by the suspension structure. As a result, the drawbacks associated with the dynamic presence of abnormal vibration modes are avoided.

Preferably, the suspension structure further comprises a flexible connection between the air intake structure of the turboprop and a compressor casing of said turboprop.

Also preferably, the attachment frame is fastened to the air intake structure of the turboprop by a connection having a degree of freedom for adjustment in a plane that is transverse relative to the longitudinal axis of the turboprop. Such an adjustment makes it possible to limit assembly clearances and phenomena of relative movements between the air intake structure and the air flow passage through the air intake structure.

Under such circumstances, the attachment frame may be fastened to the air intake structure of the turboprop by bolt fasteners passing through holes of oblong shape formed in the attachment frame so as to impart a degree of freedom for adjustment in a plane that is transverse relative to the longitudinal axis of the turboprop to the connection between the attachment frame and the air intake structure.

The attachment frame may comprise two longitudinal arms that are connected together firstly by a front frame fastened to the air intake structure of the turboprop, and secondly by a rear frame fastened to the suspension frame.

In an advantageous provision, the connection between the attachment frame and the air intake structure of the turboprop includes at least one sliding pivot connection enabling the air intake structure to be opened. It is particularly useful to be able to open the air intake structure in order to have easy access to certain pieces of equipment situated at the front of the turboprop, in particular in the context of a maintenance operation.

Under such circumstances, the air intake structure of the turboprop may comprise two lugs, each co-operating with a pin secured to the attachment frame in order to form two sliding pivot connections.

Still under such circumstances, the suspension structure may further comprise a closure catch between the air intake structure of the turboprop and a stationary fan cover of the turboprop so as to avoid any untimely opening of the air intake structure. The closure catch and the sliding pivot connection are preferably diametrically opposite.

In another embodiment, the suspension frame further comprises two thrust take-up rods for connecting the main beam to an engine casing, and a downstream suspension rod and an upstream suspension rod for connecting the two ends of the suspension frame to the engine casing.

BRIEF DESCRIPTION OF THE DRAWINGS

Other characteristics and advantages of the present invention appear from the following description made with reference to the accompanying drawings, which show implementations having no limiting character. In the figures.

DETAILED DESCRIPTION OF THE INVENTION

Figure 1:
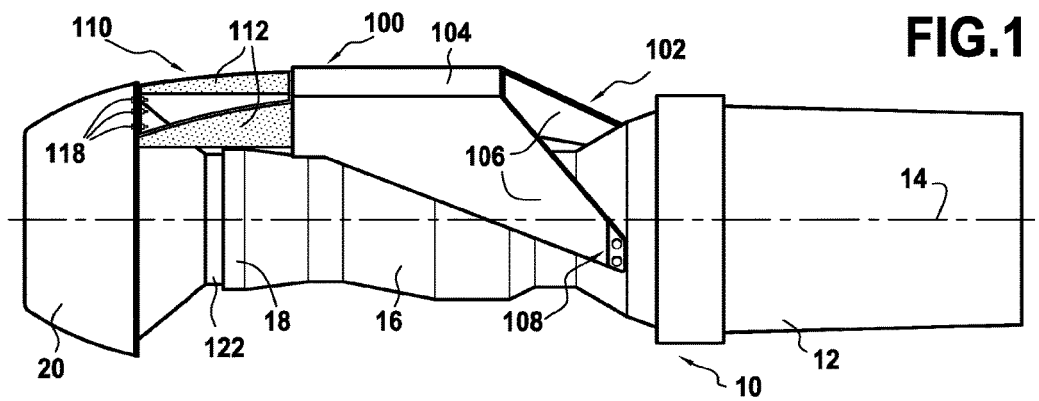
FIG. 1 is a diagrammatic perspective view of a suspension structure in an embodiment of the invention.

FIG. 1 shows diagrammatically a turboprop 10 of the type having two contrarotating propellers that are unducted and that are mounted at the rear of the engine.

More precisely, these propellers (not shown in the figures) are mounted around an annular casing 12 centered on the longitudinal axis 14 of the turboprop and arranged behind it.

The casing 12 is extended towards the front of the turboprop by an engine casing 16 surrounding a gas generator (not shown) of the turboprop. The engine casing 16 is extended by a compressor casing 18 arranged at the front of the turboprop and surrounding a compressor thereof (not shown).

The compressor casing 18 is for connecting to an annular air intake structure 20 serving to channel the incoming air stream into the turboprop.

The turboprop 10 is fastened to a structural element of an aircraft, e.g. to the fuselage of an airplane, by means of a suspension structure 100.

More precisely, the turboprop 10 is connected to a suspension structure having one end of an attachment pylon (or mast) fastened thereto, the opposite end of the attachment pylon being fastened to the fuselage of the airplane.

In known manner, the attachment pylon (not shown in figures) comprises a plurality of beams connecting the suspension structure to the fuselage of the airplane, and also a streamlined fairing.

In the embodiments of the invention shown in FIGS. 1 to 5, the suspension structure 100 comprises in particular a suspension frame 102 formed by a longitudinally-extending main beam 104, and by two lateral beams 106 connected to the main beam, the lateral beams each being triangular in shape, for example. The suspension structure thus presents a V-shaped structure.

The main beam 104 of the suspension structure extends parallel to the longitudinal axis 14 of the turboprop and is arranged at "12 o'clock" relative thereto. The various beams of the attachment pylon are for mounting on the main beam of the suspension frame.

The suspension frame 102 is fastened to the turboprop, and more precisely to the casing 12 carrying its propellers, by fastenings 108 that are positioned at each of the free ends of the lateral beams 106.

The suspension structure 100 also comprises an attachment frame 110 connecting the suspension frame 102 to the air intake structure 20 of the turboprop.

Figure 2:
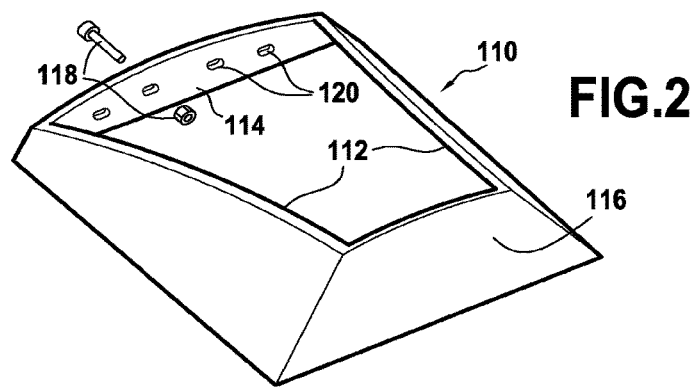
FIG. 2 is a perspective view of the attachment frame of the FIG. 1 suspension structure.

As shown in FIG. 2, the attachment frame 110 may be constituted by two longitudinal arms 112 that are connected together firstly by a front frame 114 fastened to the air intake structure 20 of the turboprop, and secondly by a rear frame 116 fastened to the suspension frame 102.

Figure 4:
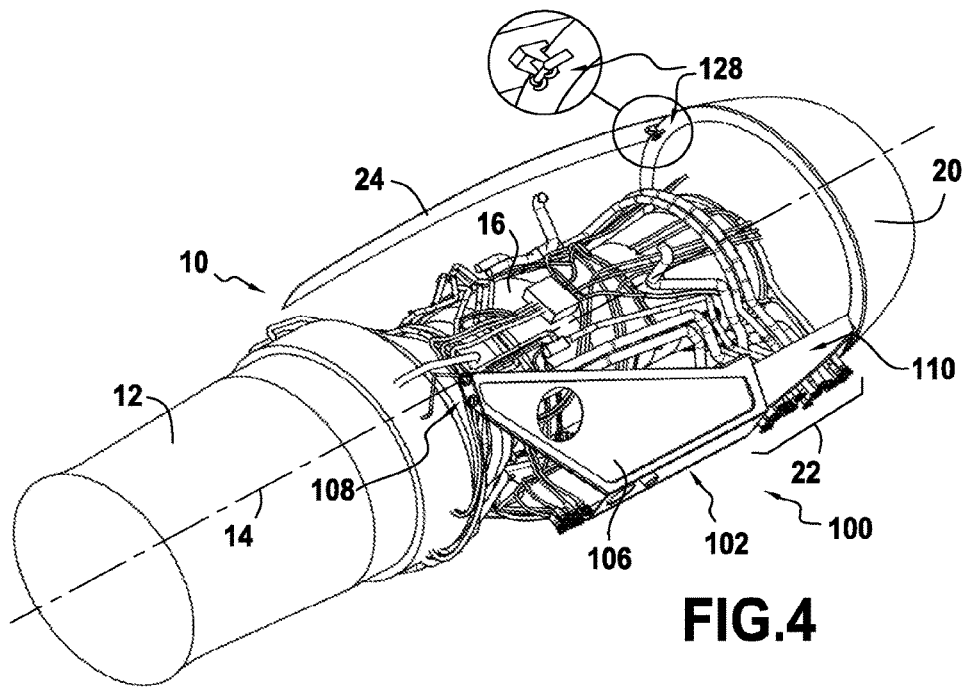
Figure 5:
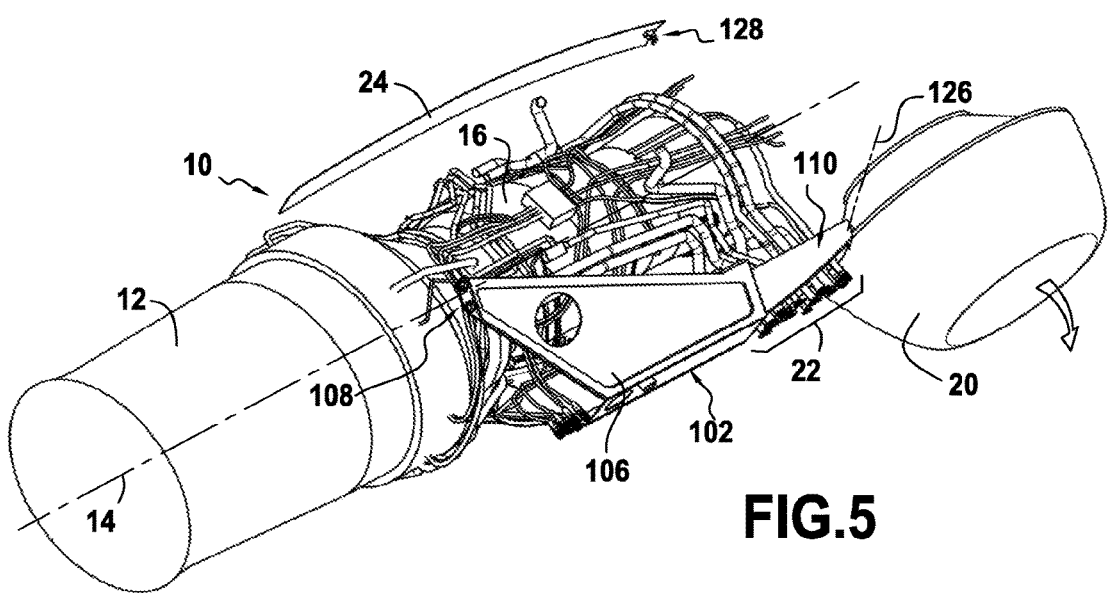

As shown in particular in FIGS. 4 and 5, such a structure for the attachment frame 110 is suitable for passing any pipework 22 of the turboprop, the pipework passing through a nonstructural portion of the attachment pylon.

In this embodiment, the rear frame 116 is fastened more particularly to the suspension frame 102 merely by fitting. The front frame 114 is preferably fastened to the air intake structure 20 of the turboprop by means of bolt fasteners 118 (e.g. nuts and bolts) passing through holes 120 of oblong shape formed in the front frame.

The oblong shape of the holes 120 in the front frame 114 enables the connection between the attachment frame and 110 and the air intake structure 20 of the turboprop to have a degree of freedom for adjustment in a transverse plane (i.e. a plane perpendicular to the longitudinal axis 14 of the turboprop).

Furthermore, the suspension structure 100 also has a flexible connection between the air intake structure 20 of the turboprop and its compressor casing 18. For example, this flexible connection may be in the form of an annular gasket 122 of the bellows type or of the labyrinth type (FIG. 1). By rigidly connecting the air intake structure 20 of the turboprop to the suspension frame 120 and by installing a flexible connection at the connection between the air intake structure 20 and the compressor casing 18, any dynamic problem stemming from the connection between the air intake structure and the compressor casing is avoided.

Figure 3:
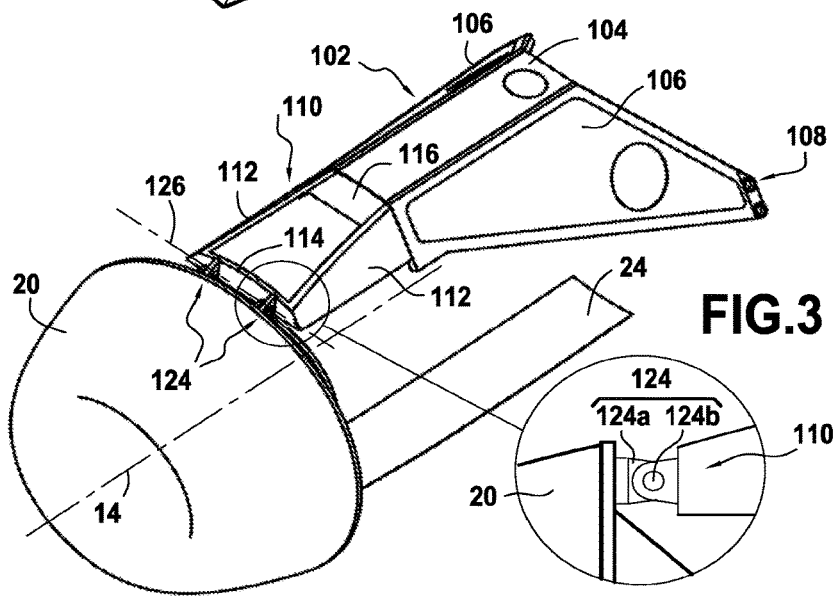
FIGS. 3 to 5 are diagrammatic perspective views of a suspension structure in another embodiment of the invention.

FIGS. 3 and 5 show a variant embodiment of the suspension structure of the invention in which the connection between the attachment frame 110 and the air intake structure 20 of the turboprop includes at least one sliding pivot connection 124 enabling the air intake structure to be opened.

More precisely, as shown in FIG. 3, the air intake structure 20 of the turboprop may have two lugs 124a, each co-operating with a pin 124b secured to the attachment frame 110 in order to form two sliding pivot connections 124.

Thus, the air intake structure 20 is free to pivot about a horizontal axis 126 passing via the pins 124b and perpendicular to the longitudinal axis 14 of the turboprop. It is particularly useful to be able to open at the air intake structure 20 of the turboprop, in particular in the context of a maintenance operation, in order to have easy access from the front of the nacelle to the various pieces of equipment of the turboprop that are situated at its front end.

Furthermore, in order to avoid any untimely opening of the air intake structure 20 of the turboprop, a closure catch 128 is advantageously provided (FIGS. 4 and 5), which catch is interposed between the air intake structure and a stationary fan cover 22 of the turboprop.

It should be observed that, in the embodiment of FIGS. 3 to 5, the closure catch 128 and the sliding pivot connections 124 are diametrically opposite.

It should also be observed that since the fan cover is not necessarily stationary, the closure catch could be installed directly on the nacelle of the turboprop.

Figure 6:
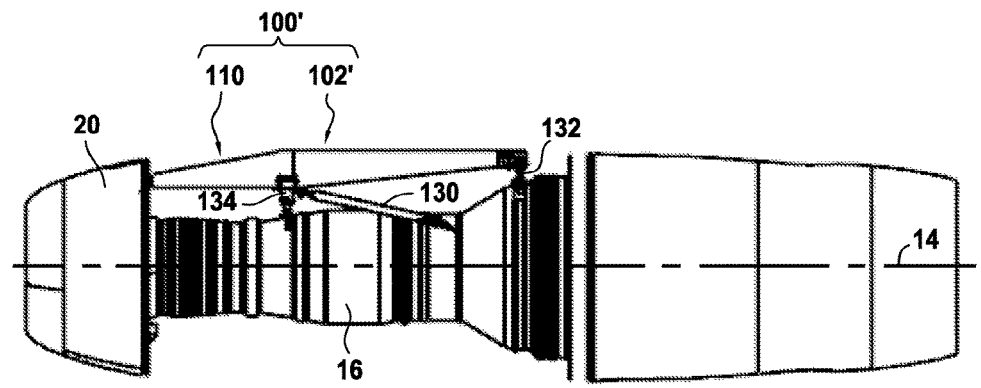
FIGS. 6 to 7 are diagrammatic views of a suspension structure in yet another embodiment of the invention.
Figure 7:
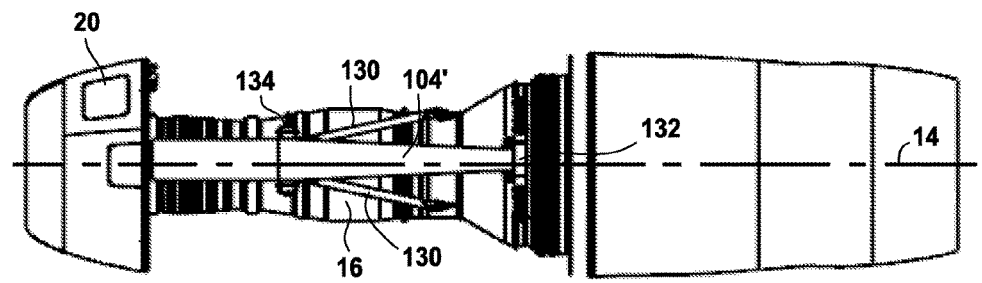

FIGS. 6 and 7 show yet another embodiment of a suspension structure 100' of the invention in which the suspension frame 102' comprises a main beam 104' extending parallel to the longitudinal axis 14 of the turboprop, and two thrust take-up rods 130 connecting the main beam 104' to the engine casing 16, and a downstream suspension rod 132 and an upstream suspension rod 134 serving to connect the two longitudinal ends of the suspension frame to the engine casing.

The attachment frame 110 is strictly identical to the attachment frame described with reference to FIGS. 1 to 5 and serves to connect the suspension frame 102' to the air intake structure 20.

The invention claimed is:

1. A suspension structure for suspending a turboprop including two unducted propellers from a structural element of an aircraft via an attachment pylon, the structure comprising:

a suspension frame for fastening to an extremity of the attachment pylon of the aircraft and including a main beam extending parallel to a longitudinal axis of the turboprop; and an attachment frame which rigidly connects the suspension frame to an air intake structure of the turboprop, wherein the attachment frame includes two longitudinal arms connected together by a front frame rigidly fastened to the air intake structure of the turboprop with a degree of freedom for adjustment in a plane that is transverse relative to the longitudinal axis of the turboprop, and by a rear frame fitted into the suspension frame, the front frame, the rear frame, and the longitudinal arms connected to each other forming a through structure.

2. A structure according to claim 1, wherein the suspension frame further includes two lateral beams fastened to the main beam such that the suspension frame presents a V-shaped structure.

3. A structure according to claim 2, wherein each of the two lateral beams includes at its free end opposite to the attachment frame a fastening to rigidly fasten the suspension frame.

4. A structure according to claim 1, wherein the attachment frame is fastened to the air intake structure of the turboprop by bolt fasteners passing through holes of oblong shape formed in the attachment frame to impart the degree of freedom for adjustment in a plane that is transverse relative to the longitudinal axis of the turboprop to the connection between the attachment frame and the air intake structure.

5. A structure according to claim 1, wherein the attachment frame is configured to allow passing of pipework of the turboprop to the attachment pylon.

6. A structure according to claim 1, wherein a connection between the attachment frame and the air intake structure of the turboprop includes at least one sliding pivot connection enabling the air intake structure to be opened.

7. A structure according to claim 6, wherein the air intake structure of the turboprop includes two lugs, each co-operating with a pin secured to the attachment frame to form two sliding pivot connections.

8. A structure according to claim 6, further comprising a closure catch between the air intake structure of the turboprop and a stationary fan cover of the turboprop to avoid untimely opening of the air intake structure.

9. A structure according to claim 8, wherein the closure catch and the sliding pivot connection are diametrically opposite.

10. A structure according to claim 1, wherein the suspension frame further includes two thrust take-up rods for connecting a main beam to an engine casing, and a downstream suspension rod and an upstream suspension rod for connecting the two ends of the suspension frame to the engine casing.

* * * * *